(12) United States Patent
Rhee et al.

(10) Patent No.: US 10,763,510 B2
(45) Date of Patent: Sep. 1, 2020

(54) ALUMINA POWDER, ALUMINA SLURRY, ALUMINA-CONTAINING COATING LAYER, MULTILAYER SEPARATION MEMBRANE AND SECONDARY BATTERY

(71) Applicant: SUMITOMO CHEMICAL COMPANY, LIMITED, Tokyo (JP)

(72) Inventors: Jihoon Rhee, Iksan-si (KR); Taebong Kim, Iksan-si (KR); Suk Lee, Iksan-si (KR)

(73) Assignee: SUMITOMO CHEMICAL COMPANY, LIMITED, Chuo-ku, Tokyo (JP)

( * ) Notice: Subject to any disclaimer, the term of this patent is extended or adjusted under 35 U.S.C. 154(b) by 0 days.

(21) Appl. No.: 16/076,749

(22) PCT Filed: Sep. 6, 2017

(86) PCT No.: PCT/JP2017/032150
§ 371 (c)(1),
(2) Date: Aug. 9, 2018

(87) PCT Pub. No.: WO2018/047871
PCT Pub. Date: Mar. 15, 2018

(65) Prior Publication Data
US 2019/0051906 A1    Feb. 14, 2019

(30) Foreign Application Priority Data

Sep. 9, 2016  (KR) .................. 10-2016-0116376

(51) Int. Cl.
*H01M 4/62* (2006.01)
*H01M 2/16* (2006.01)
(Continued)

(52) U.S. Cl.
CPC ........ *H01M 4/628* (2013.01); *B01D 67/0088* (2013.01); *B01D 69/12* (2013.01);
(Continued)

(58) Field of Classification Search
CPC .... H01M 4/628; H01M 2/166; H01M 2/1686; H01M 4/366; H01M 4/622; H01M 4/623;
(Continued)

(56) References Cited

U.S. PATENT DOCUMENTS

2010/0196750 A1   8/2010  Kajita et al.
2011/0206963 A1   8/2011  Fujita et al.
(Continued)

FOREIGN PATENT DOCUMENTS

CN     1432529 A     7/2003
CN     1565973 A     1/2005
(Continued)

OTHER PUBLICATIONS

Communication dated Feb. 27, 2019, from the European Patent Office in counterpart European Application No. 17848809.4.
(Continued)

*Primary Examiner* — James A Fiorito
(74) *Attorney, Agent, or Firm* — Sughrue Mion, PLLC (57) ABSTRACT

The present invention relates to: an alumina powder wherein a ratio (TBD/LBD) of a tapped bulk density (TBD) to a loose bulk density (LBD) is 1.5 or more; an alumina slurry containing the same; an alumina-containing coating layer; a multilayer separation membrane; and a secondary battery.

17 Claims, 4 Drawing Sheets

(51) Int. Cl.
*H01M 4/36* (2006.01)
*C01F 7/02* (2006.01)
*B01D 67/00* (2006.01)
*B01D 69/12* (2006.01)
*B01D 71/02* (2006.01)
*C01F 7/30* (2006.01)
*H01M 4/13* (2010.01)
*H01M 10/056* (2010.01)
*H01M 4/02* (2006.01)

(52) U.S. Cl.
CPC .............. *B01D 71/025* (2013.01); *C01F 7/02* (2013.01); *C01F 7/30* (2013.01); *H01M 2/166* (2013.01); *H01M 2/1686* (2013.01); *H01M 4/366* (2013.01); *H01M 4/622* (2013.01); *H01M 4/623* (2013.01); *C01P 2004/51* (2013.01); *C01P 2006/11* (2013.01); *C01P 2006/12* (2013.01); *C01P 2006/20* (2013.01); *C01P 2006/32* (2013.01); *H01M 4/13* (2013.01); *H01M 10/056* (2013.01); *H01M 2004/021* (2013.01)

(58) Field of Classification Search
CPC .. B01D 67/0088; B01D 69/12; B01D 71/025; C01F 7/02; C01F 7/30
See application file for complete search history.

(56) References Cited

U.S. PATENT DOCUMENTS

| 2011/0206977 | A1 | 8/2011 | Ikeda |
| 2014/0272534 | A1* | 9/2014 | Ueki ................... H01M 2/1646 429/144 |
| 2015/0004465 | A1 | 1/2015 | Ozaki et al. |
| 2015/0017090 | A1 | 1/2015 | Hyojo et al. |
| 2015/0104704 | A1 | 4/2015 | Kim et al. |
| 2016/0164060 | A1* | 6/2016 | Zhang ................ H01M 2/1613 429/145 |
| 2016/0380263 | A1 | 12/2016 | Nakayama et al. |

FOREIGN PATENT DOCUMENTS

| EP | 2 806 493 A1 | 11/2014 |
| JP | 08-012323 A | 1/1996 |
| JP | 2008-137838 A | 6/2008 |
| JP | 2010-205719 A | 9/2010 |
| JP | 2012-004103 A | 1/2012 |
| KR | 10-2014-0117415 A | 10/2014 |
| KR | 10-2014-0133551 A | 11/2014 |
| KR | 10-1511935 B1 | 4/2015 |
| WO | 2010/053157 A1 | 5/2010 |
| WO | 2013/133331 A1 | 9/2013 |
| WO | 2015/111740 A1 | 7/2015 |

OTHER PUBLICATIONS

Written Opinion for PCT/JP2017/032150, dated Oct. 31, 2017.
International Search Report for PCT/JP2017/032150, dated Oct. 31, 2017.
Communication dated Mar. 6, 2018 from the Japanese Patent Office in counterpart application No. 2018-503688.
Communication dated Feb. 20, 2018 from the Korean Intellectual Property Office in counterpart application No. 10-2018-7003135.
Communication dated May 31, 2018 from the Korean Intellectual Property Office in counterpart application No. 10-2018-7003135.
Communication dated Jan. 14, 2019 from the State Intellectual Property Office of the P.R.C. in counterpart Application No. 201780010878.5.
English translation of JPH 8-12323 A, published Jan. 16, 1996 (reference submitted Aug. 9, 2018).
Communication dated Dec. 6, 2019, from the European Patent Office in European Application No. 17848809.4.

* cited by examiner

ALUMINA POWDER, ALUMINA SLURRY, ALUMINA-CONTAINING COATING LAYER, MULTILAYER SEPARATION MEMBRANE AND SECONDARY BATTERY

This Application is a National Stage of International Application No. PCT/JP2017/032150 filed Sep. 6, 2017, claiming priority based on Korean Patent Application No. 10-2016-0116376 filed Sep. 9, 2016.

TECHNICAL FIELD

The present invention relates to an alumina powder, an alumina slurry, an alumina-containing coating layer, a multilayer separation membrane and a secondary battery including the alumina-containing coating layer.

BACKGROUND ART

Miniaturization and weight reduction have recently required for electric/electronic devices such as cell phones, laptop computers and camcorders. For example, lithium secondary batteries, which have small size, high performances and large capacity and are chargeable/dischargeable, have been put to practical use.

The lithium secondary battery is not only used as a power source for small electronic devices, but also has a wide range of applications in electric vehicles, electric bicycles and the like, thus requiring more excellent high-temperature storage characteristics and lifetime characteristics than before. Particularly, in the case of the lithium secondary battery for electric vehicles, further improvement in stability is required.

Electronic components applied to the electric/electronic devices are required to maintain durability under high-voltage and high-temperature operating conditions and to maintain required electric or dielectric characteristics.

Recently, attempts have been made to employ various organic/inorganic materials in order to improve the heat resistance and high-voltage driving characteristics of electronic components. For example, as the material of a functional layer such as a protective membrane and a heat radiation layer of components, inorganic oxide materials such as alumina ($Al_2O_3$) are employed.

For example, a secondary battery capable of supplying a driving voltage to various electric/electronic devices without connecting an additional power source is employed. The secondary battery can be repeatedly charged and discharged, and lithium ion secondary batteries have been actively developed, recently.

Generally, the secondary battery includes an electrode assembly in which a positive electrode and a negative electrode are disposed via a separator, and the positive electrode and the negative electrode can be formed by applying an electrode active material on an electrode current collector. The separator can be formed of a polymer film made of a polyethylene-based resin.

When charging and discharging are repeated under high-voltage and high-temperature conditions in the secondary battery, the electrode characteristics deteriorate, thus making it difficult to maintain a desired capacity for a long time, and short circuit may occur between the electrodes due to shrinkage of the separator which is a polymer film material. Therefore, an alumina coating layer has recently been utilized as a protective membrane for electrodes.

KR 10-1511935 B (Patent Document 1) refers to an electrode assembly in which alumina is coated on a surface of a lithium cobalt-based oxide, but discloses neither conditions for formation of a uniform thin alumina coating layer nor development of the material.

To achieve higher capacity/higher energy density of the secondary battery, there is a need to reduce the thickness of an inorganic oxide porous membrane and a separator which do not contribute to the battery capacity. For example, JP 2010-205719 A (Patent Document 2) proposes a technique for forming an inorganic oxide porous membrane containing an inorganic oxide filler having insulating properties on a surface of a positive electrode, a negative electrode or a separator that constitutes a lithium ion secondary battery. It is considered that the inorganic oxide porous membrane has high heat resistance and can suppress abrupt contraction of the separator. However, there was a problem that, even when the inorganic oxide porous membrane is formed using inorganic oxide powders satisfying various physical properties mentioned in these patent documents, it is difficult to reduce the thickness of the thus obtained inorganic oxide porous membrane and to impart the heat resistance to the separator.

PRIOR ART DOCUMENT

Patent Document

Patent Document 1: KR 10-1511935 B
Patent Document 2: JP 2010-205719 A

DISCLOSURE OF THE INVENTION

Problems to be Solved by the Invention

An object of the present invention is to provide an alumina powder capable of forming an alumina-containing coating layer having a uniform thickness, an alumina slurry, an alumina-containing coating layer, a multilayer separation membrane and a secondary battery.

Means for Solving the Problems

1. An alumina powder wherein a ratio (TBD/LBD) of a tapped bulk density (TBD) to a loose bulk density (LBD) is 1.5 or more.
2. The alumina powder according to the above item 1, wherein the alumina powder has a purity of 99.9% by mass or less.
3. The alumina powder according to the above item 1, wherein TBD/LBD is 1.82 to 1.90.
4. The alumina powder according to the above item 1, wherein the LBD is 0.39 to 0.44 g/cm$^3$ and the TBD is 0.72 to 0.80 g/cm$^3$.
5. The alumina powder according to the above item 1, wherein a particle diameter equivalent to 50% in the volume-based cumulative particle size distribution (D50) is 0.45 to 0.65 μm.
6. The alumina powder according to the above item 5, wherein a ratio (D90/D10) of a particle diameter equivalent to 90% in the volume-based cumulative particle size distribution (D90) to a particle diameter equivalent to 10% in the volume-based cumulative particle size distribution (D10) is 4.0 or less.
7. The alumina powder according to the above item 5, wherein a particle diameter equivalent to 100% in the volume-based cumulative particle size distribution (D100) is 3.5 μm or less.

8. The alumina powder according to the above item 1, wherein the content of particles having a particle diameter of 20 μm or more is less than 100 ppm.
9. The alumina powder according to the above item 1, wherein a BET specific surface area is 3.0 to 7.0 m²/g.
10. An alumina slurry comprising: the alumina powder according to any one of the above items 1 to 9; a binder; and a solvent.
11. An alumina-containing coating layer comprising: the alumina powder according to any one of the above items 1 to 9; and a binder.
12. A multilayer separation membrane comprising: a separation membrane; and the alumina-containing coating layer according to the above item 11 formed on at least one surface of the separation membrane.
13. A secondary battery comprising:
   a first electrode, a separation membrane and a second electrode laminated sequentially; and
   an alumina-containing coating layer formed of the alumina powder according to any one of the above items 1 to 9, the alumina-containing coating layer being formed on at least one surface of the first electrode, the separation membrane or the second electrode.
14. The secondary battery according to the above item 13, wherein the alumina-containing coating layer is formed on at least one interface of an interface between the first electrode and the separation membrane or an interface between the second electrode and the separation membrane.
15. The secondary battery according to the above item 13, wherein the alumina-containing coating layer entirely coats at least one surface the first electrode, the separation membrane or the second electrode.
16. The secondary battery according to the above item 13, wherein the alumina-containing coating layer is formed on the separation membrane, and
   wherein the alumina-containing coating layer is formed of a binder containing: the alumina powder; and a water-soluble polymer.
17. The secondary battery according to the above item 13, wherein the alumina-containing coating layer is formed on the separation membrane, and
   wherein the alumina-containing coating layer is formed of a binder containing: the alumina powder; and an aromatic polymer.
18. The secondary battery according to the above item 13, wherein the alumina-containing coating layer is formed on the separation membrane, and
   wherein the alumina-containing coating layer is formed of a binder containing: the alumina powder; and a fluorine-containing resin or a fluorine-containing rubber.
19. The secondary battery according to the above item 13, wherein the alumina-containing coating layer is formed on the separation membrane, and
   wherein the alumina-containing coating layer is formed of a binder containing: the alumina powder; and acrylate-based monomer or a copolymer of two or more monomers.

Effects of the Invention

The alumina powder of the present invention has a ratio of a tapped bulk density to loose bulk density in a predetermined range. Therefore, use of the alumina powder enables formation of a thin alumina-containing coating layer having a uniform thickness.

MODE FOR CARRYING OUT THE INVENTION

The present invention relates to: an alumina powder in which a ratio of a loose bulk density to a tapped bulk density is in a predetermined range; an alumina slurry; an alumina-containing coating layer; a multilayer separation membrane; and a secondary battery.
<Alumina Powder>
The alumina powder of the present invention has a ratio (TBD/LBD) of to a tapped bulk density (TBD) to a loose bulk density (LBD) of 1.5 or more.
TBD and LBD can be measured in accordance with the standard of JIS R 9301-2-3. More specifically, a glass measuring cylinder having an inner diameter of 37 mm, a height of 186 mm and an inner volume of 200 mL is used as a measuring container of TBD and LBD. A powder is naturally dropped from a height of 1 cm above the upper end of the measuring cylinder and the power is charged in the measuring cylinder until the cylinder is filled up. After leveling off the powder overflowing from the upper end of the measuring cylinder using a glass rod, the mass of the powder in the measuring cylinder is measured. A loose bulk density (LBD) is calculated by dividing the mass by a volume of the measuring cylinder. Thereafter, tapping is performed by dropping the measuring cylinder 100 times from the height of 3 cm. At that time, the volume is read and then a tapped bulk density (TBD) is calculated by dividing the mass by said volume. It should be confirmed that a reduction in volume of the powder is saturated during tapping 100 times when the measurement is performed.

A small difference between the values of TBD and LBD may mean that there is no significant change in porosity even after tapping. In this case, the value of TBD/LBD relatively decreases. A large difference between the values of TBD and LBD may mean that the degree of reduction in porosity after tapping is large. In this case, the value of TBD/LBD relatively increases.

When the value of TBD/LBD is less than 1.5, the bulk density of individual secondary particles (aggregated particles) contained in the alumina powder becomes too high. In this case, precipitation of alumina agglomerated particles is likely to occur in an alumina slurry containing the alumina powder, and thus it becomes difficult to ensure the dispersion stability of the alumina powder.

There is no upper limit on the value of TBD/LBD, but if a relationship between TBD and LBD becomes unbalanced, the nonuniformity of the particle shape increases and the filling property of particles deteriorates, and thus it may become difficult to form a thin alumina-containing coating layer having a uniform thickness.

The lower limit of TBD/LBD of the alumina powder is 1.50, preferably 1.60, more preferably 1.65, still more preferably 1.80, and yet more preferably 1.82. The upper limit of TBD/LBD of the alumina powder is not particularly limited, but is preferably 2.00, and more preferably 1.90. The value of TBD/LBD of the alumina powder may be in a range of, for example, 1.80 to 1.90 or 1.82 to 1.90.

The LBD value of the alumina powder is preferably 0.39 $g/cm^3$ or more and 0.44 $g/cm^3$ or less, and the TBD value of the alumina powder is preferably 0.72 $g/cm^3$ or more and 0.80 $g/cm^3$ or less, and it is possible to adjust in the range of the TBD/LBD mentioned above. The LBD value or the TBD value can be adjusted by, for example, the particle diameter of the alumina powder, the particle size distribution of the alumina powder, the processing method for the alumina powder and the like.

By further controlling the particle diameter or particle size distribution of the alumina powder, for example, by controlling the volume-based cumulative average particle diameter of the alumina powder, it is possible to improve the uniformity of the thickness, the heat resistance and the like of the obtained alumina-containing coating layer.

The volume-based cumulative particle diameter controlled with respect to the alumina particles can include D50 (particle diameter equivalent to 50% in the volume-based cumulative particle size distribution) which is a particle diameter corresponding to a cumulative percentage of 50% from the fine particle side determined from the particle size distribution curve, D90 (particle diameter equivalent to 90% in the volume-based cumulative particle size distribution) which is a particle diameter corresponding to a cumulative percentage of 90% from the fine particle side, D10 (particle diameter equivalent to 10% in the volume-based cumulative particle size distribution) which is a particle diameter corresponding to a cumulative percentage of 10% from the fine particle side, and D100 (particle diameter equivalent to 100% in the volume-based cumulative particle size distribution) which is a particle diameter corresponding to a cumulative percentage of 100% from the fine particle side. The cumulative particle diameter is measured by a laser diffraction method using a laser particle size distribution analyzer ["Microtrac MT3300EXII", manufactured by MicrotracBEL Corp.].

The D50 value of the alumina powder is preferably 0.45 or more and 0.65 μm or less, and more preferably 0.50 or more and 0.60 μm or less. If the D50 value is less than 0.45 μm, over-crowdedness of aggregation between particles may occur to cause a decrease in porosity of the obtained alumina-containing coating layer, thus failing to sufficiently ensure ionic permeability. Meanwhile, if the D50 value exceeds 0.65 μm, the proportion of alumina particles having a large particle diameter may increase to cause deterioration of binding property due to a decrease in number of contacts between particles, leading to reduction in mechanical strength of the obtained alumina-containing coating layer or deterioration of the uniformities of the thickness and physical properties.

D90/D10 of the alumina powder of the present invention is preferably 2.0 or more and 4.0 or less, and more preferably 3.0 or more and 4.0 or less. If the value of D90/D10 is less than 2.0, the filling property of the particles may deteriorate to cause deterioration of the heat resistance of the multilayer porous film. If the value of D90/D10 exceeds 4.0, the range or deviation of the particle size distribution may increase excessively to cause deterioration of the uniformity of the thickness of the obtained alumina-containing coating layer or excessive decrease in porosity of the obtained alumina-containing coating layer.

It is also possible to adjust D100 (maximum particle diameter in the particle size distribution) of the alumina powder by a method such as a dry classification, wet classification or sieving classification method, thus making it possible to more effectively realize thinning of the alumina-containing coating layer obtained using the alumina powder.

It is preferred that the D100 value of the alumina powder is 3.5 μm or less. If the D100 value exceeds 3.5 μm, the proportion of coarse alumina particles may increase, thus making it difficult to realize thinning of the obtained alumina-containing coating layer, or the heat resistance of the obtained alumina-containing coating layer may deteriorate.

The alumina powder may contain coarse particles in size of 20 μm or more in a trace amount which is not detectable by a particle size distribution meter. The content of coarse particles having a particle diameter of 20 pm or more is preferably 100 ppm or less, and more preferably 10 ppm or less, based on the total mass of the alumina powder of the present invention. If the content of the coarse particles exceeds 100 ppm, it may become difficult to realize thinning of the obtained alumina-containing coating layer, or voids may be likely to form around the coarse particles in the obtained alumina-containing coating layer, leading to deterioration of the heat resistance of the obtained alumina-containing coating layer.

In formation of the alumina-containing coating layer, there is a need to prepare an alumina slurry containing the alumina powder. If the content of the D100 and coarse particles having a particle diameter of 20 μm or more in the alumina powder is in the above range, it is possible to omit an additional pulverization step of further reducing the particle diameter of alumina particles in the slurry, thus enabling reduction in process cost required to prepare the alumina slurry.

It is also possible to improve the particle size distribution by adjusting the specific surface area of the alumina powder. A BET specific surface area of the alumina powder is preferably 3.0 $m^2/g$ or more and 7.0 $m^2/g$ or less. If the BET specific surface area is less than 3.0 $m^2/g$, the proportion of alumina particles having a large particle diameter may excessively increase to cause deterioration of the heat resistance of the obtained alumina-containing coating layer, or the thickness of the alumina-containing coating layer may excessively increase. If the BET specific surface area exceeds 7.0 $m^2/g$, aggregation of alumina particles having a small particle diameter is likely to occur, and thus the uniformity of the thickness of the obtain alumina-containing coating layer may deteriorate, or the void size between the alumina particles may significantly vary depending on the location. The BET specific surface area is obtained by a nitrogen adsorption method (single-point method) in accordance with the method defined in JIS-Z8830 (2013) using "HM model-1201" manufactured by MOUNTECH Co., Ltd.

By producing the alumina powder in the above range of the particle size, the particle size distribution and the specific surface area, mechanical properties such as heat resistance and durability of the alumina-containing coating layer formed using the alumina powder are improved, and the uniformity of the thickness of the film is improved. When the alumina-containing coating layer is applied to, for example, an electrode assembly of a secondary battery, a difference in performance due to the region is substantially eliminated, thus enabling an improvement in operation reliability at high temperature and high voltage.

The purity of the alumina constituting the alumina powder is not particularly limited. High-purity alumina having a purity exceeding 99.9% by mass may be used, or Bayer alumina having a purity of 99.9% by mass or less may be used. The purity of the high-purity alumina is preferably 99.99% by mass or more. The purity of the Bayer alumina is usually 90% by mass or more, and preferably 99% by mass or less. From the viewpoint of cost, the above-mentioned Bayer alumina is preferably used.

The purity of alumina is calculated by subtracting the total mass (%) of Si, Na, Mg, Cu, Fe and Ca contained in alpha-alumina from 100%. That is, it is calculated by the following formula.

Purity (%)=100–total mass of impurities (%)

If the purity of alumina is less than 90% by mass in battery applications, Na contained in the alpha-alumina may increase, thus failing to obtain satisfactory electrical insulation properties, or the mixing amount of metallic foreign matters that can cause a short circuit may increase.

Figure 1:
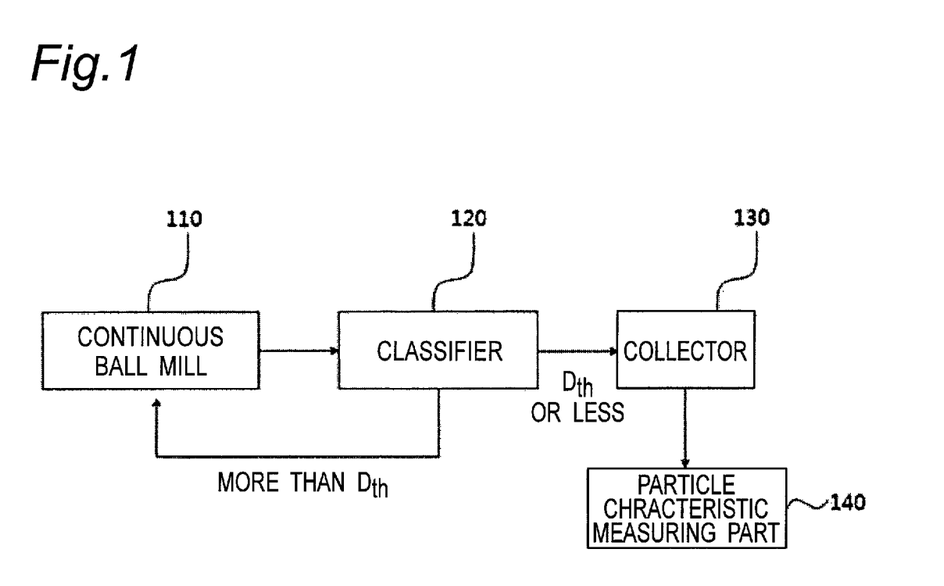
FIG. 1 is a process flow chart for explaining a method for manufacturing an alumina powder according to an embodiment of the present invention.

A method for producing an alumina powder of the present invention will be described below with reference to FIG. 1. FIG. 1 is a process flow chart for explaining a method for producing alumina powder according to an embodiment of the present invention.

As shown in FIG. 1, a raw material alumina powder is charged in a continuous ball bill 110 and then pulverized by a ball mill.

The raw material alumina powder may be produced by a method known in the technical field or may be a commercially available product. For example, the raw material alumina powder can be produced by adding a growth agent to an aluminum precursor such as aluminum hydroxide to grow an alumina crystal. The raw material alumina powder can also be obtained by a known method such as the Bayer method.

The raw material alumina powder can be pulverized by the continuous ball bill 110 and separated/sorted in a classifier 120. For example, an air blow device is connected to the continuous ball mill 110, and the pulverized raw material alumina powder can be introduced into the classifier 120 by air blow.

The classifier 120 includes a rotating classifying wheel, and alumina particles having a particle size ($D_{th}$) or less at a classification point can pass through the classifying wheel. Meanwhile, alumina particles exceeding the particle size ($D_{th}$) at a classification point cannot pass through the classifying wheel and are returned to the continuous ball mill 110, where the alumina particles can be further pulverized by the ball mill. By repeating the above process, it is possible to substantially perform a continuous ball milling step.

The alumina particles passed through the classifier 120 can be moved and collected in a collector 130.

The coarse particle size ($D_{th}$) that enables passing through the classifying wheel is usually adjusted to less than 5 μm, and preferably less than 3 μm.

The alumina particles collected in the collector 130 can be segmented and/or collected in a plurality of batches. For the plurality of batches, it can be determined by a particle characteristic measuring unit 140 whether or not the particle size distribution, the bulk density and the specific surface area of the range are satisfied. A batch satisfying the above ranges can be selected and utilized as the alumina powder of the present invention.

The particle characteristic measuring part 140 can include a particle size distribution measuring device, a bulk density measuring device and a BET measuring device known in the technical field.

<Alumina Slurry>

The alumina powder and a binder resin are mixed with a solvent, and additional components such as thickeners and/or surfactants are further mixed as necessary, thus making it possible to prepare an alumina slurry.

It is preferred that the additional components such as the binder resin or the thickener and/or the surfactant contained in the alumina slurry are insoluble in an electrolytic solution of a nonaqueous electrolyte secondary battery, and are electrochemically stable in the use range of the nonaqueous liquid secondary battery.

It is possible to use, as the binder resin, for example, polyolefins such as polyethylene, polypropylene, polybutene and ethylene propylene copolymer; fluorine-containing resins such as polyvinylidene fluoride (PVDF), Teflon, a vinylidene fluoride-hexafluoropropylene copolymer, a tetrafluoroethylene-hexafluoropropylene copolymer, a tetrafluoroethylene perfluoroalkyl vinyl ether copolymer, a vinylidene fluoride-tetrafluoroethylene copolymer, a vinylidene fluoride-trifluoroethylene copolymer, a vinylidene fluoride-trichloroethylene copolymer, a vinylidene fluoride-vinyl fluoride copolymer, a vinylidene fluoride-hexafluoropropylene-tetrafluoroethylene copolymer and an ethylene-tetrafluoroethylene copolymer; fluorine-containing rubbers having a glass transition temperature of about 23° C. or lower among the fluorine-containing resins; aromatic polyamide; rubbers such as aromatic polyamide (aramid resin), a styrene-butadiene copolymer and a hydrogen compound thereof, a methacrylic acid ester copolymer, a acrylonitrile-acrylic acid ester copolymer, a styrene-acrylic acid ester copolymer, an ethylene propylene rubber and polyvinyl acetate; aromatic polymers having a melting point or a glass transition temperature of about 180° C. or higher, such as polyphenyl ether, polysulfone, polyether sulfone, polyphenyl sulfide, polyether imide, polyamide imide, polyether amide, polyester and polyester amide; and water-soluble polymers such as polyvinyl alcohol, polyethylene glycol, cellulose ether, sodium alginate, polyacrylic acid, polyacrylamide and polymethacrylic acid. These binder resins may be used alone, or two or more binder resins may be used in combination.

The aromatic polyamide includes, for example, poly (paraphenylene phthalamide), poly(metaphenylene isophthalamide), poly(parabenzamide), poly(paraphenylene terephthalamide), poly(metabenzamide), poly(4,4'-benzanilide terephthalamide), poly(paraphenylene-4,4'-biphenylenedicarboxylic acid amide), poly(metaphenylene-4,4'-biphenylenecarboxylic acid amide), poly(paraphenylene-2,6-naphthalenedicarboxylic acid amide), poly (metaphenylene-2,6-naphthalenedicarboxylic acid amide), poly(2-chloroparaphenylene terephthalamide), a paraphenylene terephthalamide/2,6-dichloroparaphenylene terephthalamide copolymer, a metaphenylene terephthalamide/2,6-dichloroparaphenylene terephthalamide copolymer and the like. Of these aromatic polyamides, poly (paraphenylene terephthalamide) can be preferably used.

It is also possible to use, as the binder resin, a water-insoluble fine polymer (emulsion) prepared by dispersing the water-insoluble polymer (e.g., acrylate-based resin) in an aqueous solvent.

The water-insoluble polymer means a polymer which is not dissolved in an aqueous solvent and is dispersed in an aqueous solvent in the form of particles. The water-insoluble polymer means a polymer in which the content of an insoluble component becomes 90% by mass or more when 0.5 g of the polymer is mixed with 100 g of water at 25° C. Meanwhile, the water-soluble polymer means a polymer in which the content of an insoluble component is less than 0.5% by mass when 0.5 g of the polymer is mixed with 100 g of water at 25° C. The particle shape of the water-insoluble polymer is not particularly limited and is preferably spherical.

The water-insoluble polymer can be produced, for example, by polymerizing a composition containing a monomer mentioned below in an aqueous solvent to form particles of a polymer.

The monomer of the water-insoluble polymer includes, for example, styrene, vinyl ketone, acrylonitrile, methyl methacrylate, ethyl methacrylate, glycidyl methacrylate, glycidyl acrylate, methyl acrylate, ethyl acrylate, butyl acrylate and the like.

The polymer includes, in addition to a homopolymer of a monomer, a copolymer of two or more monomers, and also includes: fluorine-containing resins such as Teflon, an ethylene tetrafluoride-propylene hexafluoride copolymer, an ethylene tetrafluoride-vinyl copolymer and polyvinylidene fluoride; a melamine resin; a urea resin; polyethylene, polypropylene; polyacrylic acid, polymethacrylic acid and the like.

From the viewpoint of the binding property between alumina particles, it is possible to preferably use, as the water-insoluble fine polymer dispersed in an aqueous solvent, a homopolymer of an acrylate-based monomer such as methyl methacrylate, ethyl methacrylate, glycidyl methacrylate, glycidyl acrylate, methyl acrylate, ethyl acrylate, or butyl acrylate, or a copolymer of two or more monomers.

The binder resin is preferably a polyolefin, a fluorine-containing resin, an aromatic polyamide, a water-soluble polymer, and a water-insoluble fine polymer (emulsion) dispersed in an aqueous solvent. When the alumina-containing coating layer is disposed in contact with a positive electrode in a secondary battery, a fluorine-containing resin is advantageous in view of easily maintaining various performances such as charge/discharge rate characteristics and resistance characteristics (liquid resistance) of a nonaqueous electrolyte secondary battery due to acid deterioration during battery operation, and polyvinylidene fluoride resins (e.g., a hybrid polymer of vinylidene fluoride and at least one monomer selected from the group consisting of hexafluoropyrene, tetrafluoroethylene, trifluoroethylene, trichlorethylene and vinyl fluoride, and a vinylidene fluoride homopolymer) are preferable.

When a water-soluble polymer and the water-insoluble fine polymer dispersed in the aqueous solvent are used as the binder resin contained in the alumina slurry of the present invention, it is preferable to use, as the solvent contained in the alumina slurry, water which is environmentally friendly. The water-soluble polymer includes cellulose ether, sodium alginate and the like, and cellulose ether can be preferably used.

The cellulose ether includes, for example, carboxymethyl cellulose (CMC), hydroxyethyl cellulose (HEC), carboxyethyl cellulose, methyl cellulose, ethyl cellulose, cyanoethyl cellulose, hydroxyethyl cellulose and the like. From the aspect of durability, lifetime, chemical stability and the like, CMC or HEC can be preferably used, and CMC can be more preferably used.

As the solvent mixed with the alumina slurry, ordinary solvents in the technical field can be used without particular limitation, and examples thereof include water, acetone, alcohols (methanol, ethanol, propyl alcohol, butanol, etc.), 1-methyl-2-pyrrolidone, propylene glycol monomethyl ether acetate, tetrahydrofuran and the like. These solvents can be used alone, or two or more solvents can be used in combination. An aqueous solvent include water and is not particularly limited as long as it can disperse the water-insoluble polymer particles therein.

The aqueous solvent can also contain an organic solvent capable of dissolving in water at an arbitrary ratio, such as methanol, ethanol, isopropyl alcohol, acetone, tetrahydrofuran, acetonitrile and N-methylpyrrolidone. The aqueous solvent can contain a surfactant such as sodium laurylbenzene sulfonate, a dispersant such as a sodium salt of polyacrylic acid carboxymethylcellulose and the like. When the solvent is used together with additives such as the surfactant, additives can be used alone or two or more additives can be used as a mixture. The mass ratio of the organic solvent to water is preferably 0.1 to 99% by mass, more preferably 0.5 to 80% by mass, and still more preferably 1 to 50% by mass.

The solvent, the binder resin and other components that can be added to the alumina slurry mentioned above are merely illustrative, and can be appropriately selected and adjusted considering properties and applications of the alumina-containing coating layer obtained from a base material on which an alumina slurry is applied, and the alumina slurry.

When the alumina-containing coating layer containing the alumina powder as an aggregate is produced, the content of the binder is not particularly limited and is preferably in a range of 0.1 to 20 parts by weight based on 100 parts by mass of the alumina of the present invention. The content of the solvent in the alumina slurry of the present invention is not particularly limited and is preferably in a range of 10 to 500 parts by mass based on 100 parts by mass of the alumina of the present invention.

Various additives such as dispersants, thickeners, leveling agents, antioxidants, defoamers, pH adjustors containing an acid or alkali and additives having a function of suppressing the side reaction such as decomposition of an electrolytic solution may be added to the alumina slurry of the present invention, in addition to the above-mentioned components, for the purpose of dispersion stabilization and improvement in coatability. These additives are not particularly limited as long as they are chemically stable in a range of use of the nonaqueous electrolyte secondary battery and do not exert a large influence on a battery reaction. It is possible to use, as the dispersant, for example, organic alkali salt compounds such as sodium dodecyl sulfate, lithium lauryl sulfate and sodium hexametaphosphate. It is also possible to use, as the thickener, HEC, CMC, polyethylene glycol and the like. These various additives are preferably those capable of being removed when an alumina-containing coating layer is formed but may remain in alumina-containing coating layer. The content of each additive is not particularly limited and is preferably 10 parts by mass or less based on 100 parts by mass of the alumina of the present invention.

The alumina slurry of the present invention can be prepared by mixing the alumina of the present invention, a binder resin and a solvent, followed by dispersion. The method for dispersing the alumina slurry is not particularly limited, and it is possible to use a stirring method using a known planetary mixer or ultrasonic irradiation, or a dispersing method using beads mill.

<Alumina-Containing Coating Layer and Multilayer Separation Membrane>

An alumina-containing coating layer can be formed on a base material by applying the alumina slurry on the base material, followed by drying and/or calcination of the alumina slurry.

The base material is not particularly limited and includes a plastic film made of polyethylene, polypropylene, poly-imide, polyacryl or the like, a conductive film, or a carbon-based film. When the base material is a separation membrane for a secondary battery, it can be used as a multilayer separation membrane in which an alumina-containing coating layer is formed on a separation membrane.

Use of the alumina slurry containing the alumina powder enables formation of an alumina-containing coating layer which has a thin uniform thickness and has high heat resistance and mechanical strength.

<Secondary Battery>

Figure 2A:
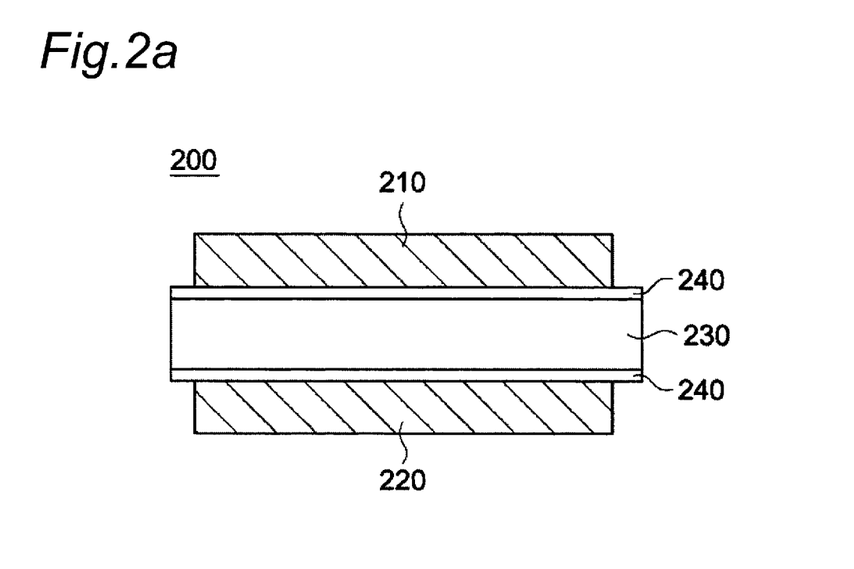
FIGS. 2a and 2b show a schematic cross-sectional view of an electrode assembly of a secondary battery according to an embodiment of the present invention.
Figure 2B:
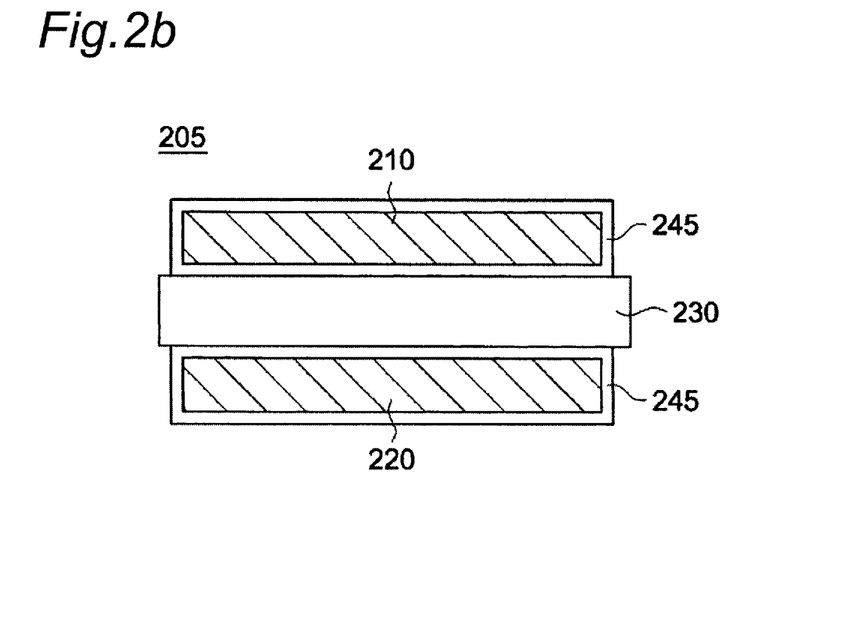

As shown in FIG. 2a and FIG. 2b, the secondary battery is provided with electrode assemblies 200 and 205 including a first electrode 210 and a second electrode 220 laminated so as to face each other via a separation membrane 230 interposed therebetween. The secondary battery can include an electrode stack in which plural electrode assemblies 200 and 205 are stacked, and a case for housing the electrode stack. An electrolytic solution can be injected into the case.

The first electrode 210 and the second electrode 220 can correspond to a positive electrode (cathode) and a negative electrode (anode), respectively. In this case, after coating an electrode current collector with a positive electrode active material and a negative electrode active material, respectively, the first electrode 210 and the second electrode 220 can be formed by a pressing step.

The electrode current collector is not particularly limited and can include metals such as copper, aluminum, nickel and titanium, or alloys thereof.

The positive electrode active material is not particularly limited and can include an oxide containing cobalt, manganese and/or nickel. For example, the positive electrode active material can include a lithium oxide and a lithium-manganese oxide-based material can be used.

The negative electrode active material is not particularly limited and can include: carbon-based materials such as crystalline carbon, amorphous carbon, carbon composite and carbon fiber; lithium, alloys of lithium and other elements; silicon or tin and the like.

The separation membrane 230 is disposed between the first electrode 210 and the second electrode 220 to physically separate them and to retain the electrolytic solution thereby ensuring ionic conductivity between the positive and negative electrodes.

A first electrode tab and a second electrode tab (not shown) for connecting a power source can be coupled to the ends of the first electrode 210 and the second electrode 220, respectively. The first electrode tab and the second electrode tab may be disposed on the same side or the opposite side of the electrode assembly 200.

The alumina-containing coating layer of the present invention can be formed on each surface of the first electrode 210, the second electrode 220 and/or the separation membrane 230. As shown in FIG. 2a, the alumina-containing coating layer 240 can be formed on both of an interface with the first electrode 210 of the separation membrane 230 and an interface with the second electrode 220 of the separation membrane 230. Alternatively, the alumina-containing coating layer 240 can also be formed on either an interface with the first electrode 210 of the separation membrane 230 or an interface with the second electrode 220 of the separation membrane 230.

As shown in FIG. 2b, the alumina-containing coating layer 245 can be substantially formed on the entire surface of the first electrode 210 and the second electrode 220.

The alumina-containing coating layer can be formed by applying the alumina slurry of the present invention on the first electrode 210, the separation membrane 230 and/or the second electrode 220, followed by drying or calcination of the alumina slurry. When the alumina slurry of the present invention is used, it is possible to form a thin alumina-containing coating layer having a uniform thickness.

Short circuit between the first electrode 210 and the second electrode 220 can be prevented by forming the alumina-containing coating layer on the first electrode 210, the separation membrane 230 and/or the second electrode 220. When the separation membrane 230 is made of a resin film, the separation membrane 230 may be broken during high-temperature and high-voltage operation to cause short circuit between the electrodes. However, when the alumina-containing coating layer is interposed between the separation membrane 230 and the first electrode 210 and/or the second electrode 220, contraction of the separation film is suppressed, thus enabling prevention of the occurrence of short circuit. Since the alumina-containing coating layer is formed to have a uniform thickness substantially in the entire region, it is possible to prevent the deviation of the operation from occurring depending on the region of one electrode assembly or different electrode assemblies.

The separation membrane 230 is a porous film disposed between a positive electrode and a negative electrode in a nonaqueous electrolyte secondary battery. Such a porous film may be made of a porous and membranous base material containing a polyolefin-based resin as a main component (polyolefin-based porous base material) and is a film having a structure including pores connected with each other therein, a gas or liquid being permeable from one surface to the other surface.

The porous film is melted to make a separation membrane (separator) for a nonaqueous electrolyte secondary battery non-porous when the battery generates heat to impart the shutdown function to the separation membrane for a nonaqueous electrolyte secondary battery. The porous film may be formed of a single layer or plural layers.

The piercing strength of the porous film is preferably 3N or more. If the piercing strength is too small, the separation membrane may be broken by positive and negative electrode active material particles leading to short circuit of positive and negative electrodes, during laminating and winding operations of positive and negative electrodes and a separation membrane of the battery assembling process, a clamping operation of the wound group, or application of pressure to the battery from the outside. The piercing strength of the porous film is preferably 10N or less, and more preferably 8N or less.

The thickness of the porous film may be appropriately determined taking the thickness of members for a nonaqueous electrolyte secondary battery, which constitute the non-aqueous electrolyte secondary battery, into account, and the thickness is preferably 4 to 40 µm, more preferably 5 to 30 µm, and still more preferably 6 to 15 µm.

The porosity by volume of the porous film is preferably 20 to 80%, and more preferably 30 to 75%, in order to retain a larger amount of an electrolytic solution and to obtain the function (shutdown) of reliably preventing the flow of an excessively large current at a lower temperature. The average size (average pore size) of the porous film is preferably 0.3 µm or less, and more preferably 0.14 µm or less so as to enable achievement of sufficient ionic permeability and prevention of entrainment of particles into a positive electrode and a negative electrode when the porous film is used as a separation membrane.

The proportion of the polyolefin-based component in the porous film is indispensably 50% by volume or more, preferably 90% by volume or more, and more preferably 95% by volume or more, based on the entire porous film. It is preferred that a high-molecular weight component having a weight average molecular weight of $5\times10^5$ to $15\times10^6$ is included in the polyolefin-based component of the porous film. It is particularly preferred that the strength of the entire porous film and separation membrane for a nonaqueous electrolyte secondary battery increases by containing, as the polyolefin-based component of the porous film, a polyolefin component having a weight average molecular weight of 1,000,000 or more.

Examples of the polyolefin-based resin included in the porous film include a high-molecular weight homopolymer or copolymer obtained by polymerizing ethylene, propylene, 1-butene, 4-methyl-l-pentene, 1-hexene or the like. The porous film can be a layer containing these polyolefin-based resins alone and/or two or more polyolefin-based resins. Particularly, a high-molecular weight polyethylene composed mainly of ethylene is preferable. The porous film may contain components other than polyolefin as long as the function of the layer is not impaired.

The air permeability of a porous film is usually in a range of 30 to 500 seconds/100 cc, and preferably 50 to 300 seconds/100 cc, in terms of the Gurley value. If the porous film has the air permeability in the above range, it is possible to obtain sufficient ionic permeability when used as a separation membrane.

The basis weight of the porous film is usually 4 to 20 $g/m^2$, preferably 4 to 12 $g/m^2$, and more preferably 5 to 10 $g/m^2$, in view of increasing the strength, thickness, handleability and weight, and weight energy density and volume energy density of the battery when using as a separation membrane of a nonaqueous electrolyte secondary battery.

A method for manufacturing a porous film will be described below. A porous film containing a polyolefin-based resin as a main component is preferably manufactured by the following method when the porous film contains an ultrahigh-molecular weight polyolefin and a low-molecular weight hydrocarbon having a weight average molecular weight of 10,000 or less.

Namely, it is possible to obtain by the method including: the step (1) of kneading an ultrahigh-molecular weight polyolefin, a low-molecular weight hydrocarbon having a weight average molecular weight of 10,000 or less, and a pore-forming agent to obtain a polyolefin resin composition; the step (2) of rolling the polyolefin resin composition using a rolling mill roll to form a sheet (rolling step); the step (3) of removing the pore-forming agent from the sheet obtained in the step (2); and the step (4) of drawing the sheet obtained in the step (3) to obtain a porous film. Before the operation of removing the pore-forming agent in the sheet in the step (3), the operation of drawing the sheet in the step (4) may be performed.

The ultrahigh-molecular weight polyolefin is preferably a powder.

Examples of the low-molecular weight hydrocarbon include a low-molecular weight polyolefin such as polyolefin wax, and a low-molecular weight polymethylene such as Fischer-Tropsch wax. The weight average molecular weight of the low-molecular weight polyolefin and low-molecular weight polymethylene is preferably 200 or more and 3,000 or less. If the weight average molecular weight is 200 or more, there is no fear of evaporation during formation of a porous film. It is preferred that the weight average molecular weight is 3,000 or less since mixing with the ultrahigh-molecular weight polyolefin is performed more uniformly.

Examples of the pore-forming agent include an inorganic filler and a plasticizer. Examples of the inorganic filler include an inorganic filler which can dissolved in an aqueous solvent containing an acid, an aqueous solvent containing an alkali, or an aqueous solvent composed mainly of water.

Examples of the inorganic filler, which can be dissolved in the aqueous solvent containing an acid, include calcium carbonate, magnesium carbonate, barium carbonate, zinc oxide, calcium oxide, aluminum hydroxide, magnesium hydroxide, calcium hydroxide and calcium sulfate, and calcium carbonate is preferable in view of the fact that it is inexpensive and is easy to obtain a fine powder. Examples of the inorganic filler, which can be dissolved in the aqueous solvent containing an alkali, include silicic acid and zinc oxide and silicic acid is preferable since it is inexpensive and is easy to obtain a fine powder. Examples of the inorganic filler, which can be dissolved in the aqueous solvent composed mainly of water, include calcium chloride, sodium chloride and magnesium sulfate.

Examples of the plasticizer include a low-molecular weight nonvolatile hydrocarbon compound such as liquid paraffin and mineral oil.

The alumina-containing coating layer is optionally laminated on one or both surfaces of a separation membrane for a nonaqueous electrolyte secondary battery which is a porous film.

There is no particular limitation on the method for applying the alumina slurry on the separation membrane, namely, a method for forming alumina-containing coating layer on a surface of a separation membrane subjected optionally to a hydrophilization treatment. When the alumina-containing coating layer is laminated on both surfaces of a separation membrane, it is possible to apply a sequential laminating method in which an alumina-containing coating layer is formed on one surface of a separation membrane and then an alumina-containing coating layer is formed on the other surface, or a simultaneous laminating method in which an alumina-containing coating layer is simultaneously formed on both surfaces of a separation membrane.

Examples of the method for forming an alumina-containing coating layer include a method in which an alumina slurry is directly applied on a surface of a separation membrane and then a solvent (dispersion medium) is removed; a method in which an alumina slurry is applied to an appropriate support and a solvent (dispersion medium) was removed to form an alumina-containing coating layer, and then this alumina-containing coating layer and a separation membrane are pressure-bonded with each other and the support is peeled off; a method in which an alumina slurry is applied to an appropriate support and a porous film is pressure-bonded to the coated surface, and then the support is peeled off and the solvent (dispersion medium) is removed; and a method in which a separation membrane is dipped in an alumina slurry to perform dip coating and then a solvent (dispersion medium) is removed.

It is possible to control the thickness of the alumina-containing coating layer by adjusting the thickness of a coating film in a wet state after coating, the weight ratio of a resin to microparticles, the solid component concentration of the alumina slurry (sum of the concentration of the resin and the concentration of microparticles) and the like. It is possible to use, as the support, for example, a film made of a resin, a belt made of metal, or a drum.

The method for applying the alumina slurry to a separation membrane or a support may be a method capable of realizing required basis weight and coated area and is not particularly limited. A conventionally known method can be employed as the method for applying the alumina slurry. Specific examples of such method include a gravure coater method, a small-diameter gravure coater method, a reverse roll coater method, a transfer roll coater method, a kiss coater method, a dip coater method, a knife coater method, an air doctor blade coater method, a blade coater method, a rod coater method, a squeeze coater method, a cast coater method, a bar coater method, a die coater method, a screen printing method and a spray applying method.

The method for removing a solvent (dispersion medium) is generally a method by drying. Examples of the drying method include a natural drying method, a fan drying method, a heat drying method and a vacuum drying method and may be any method as long as the solvent (dispersion medium) can be sufficiently removed. A usual drying device can be used for drying.

The thickness of the alumina-containing coating layer formed by the above-mentioned method is preferably 0.5 to 15 µm (per one surface), more preferably 2 to 10 µm (per one surface), still more preferably 2 to 5 µm, and particularly preferably 2 to 3 µm, when a separation membrane is used as a base material and an alumina-containing coating layer is laminated on one or both surfaces of the separation membrane to form a multilayer separation membrane.

The thickness of the alumina-containing coating layer is preferably 1 µm or more (0.5 µm or more on one surface) since it is possible to sufficiently prevent internal short circuit due to breakage of a battery in a multilayer separation membrane for a nonaqueous electrolyte secondary battery including an alumina-containing coating layer and to maintain the retaining amount of an electrolytic solution in the alumina-containing coating layer. Meanwhile, the thickness of the alumina-containing coating layer is preferably 30 µm or less (15 µm or less on one surface) in total of both surfaces since it is possible to suppress an increase in permeation resistance of ions such as lithium ions over the entire multilayer separation membrane for a nonaqueous electrolyte secondary battery including the alumina-containing coating layer to prevent degradation of a positive electrode and degradation of rate characteristic and cycle characteristic when charge/discharge cycle is repeated, and to suppress an increase in distance between a positive electrode and a negative electrode to prevent an increase in size of a nonaqueous electrolyte secondary battery.

In the following description with respect to physical properties of the alumina-containing coating layer, when a porous layer is laminated on both surfaces of a porous film, the physical properties at least indicate physical properties of the alumina-containing coating layer laminated to the surface opposite to a positive electrode in the porous film when a secondary battery is assembled.

The basis weight per unit area (per one surface) of the alumina-containing coating layer may be appropriately determined taking the strength, thickness, weight and handleability of the multilayer separation membrane for a nonaqueous electrolyte secondary battery into account. The basis weight is usually 1 to 20 g/m$^2$, preferably 4 to 15 g/m$^2$, and more preferably 4 to 12 g/m$^2$, so as to increase the weight energy density and volume energy density of a nonaqueous electrolyte secondary battery including the multilayer separation membrane for a nonaqueous electrolyte secondary battery as the member. The basis weight of the alumina-containing coating layer is preferably in the above range since it is possible to increase the weight energy density and volume energy density of a nonaqueous electrolyte secondary battery including the multilayer separation membrane with an alumina-containing coating layer as the member, and to reduce the weight of the battery.

The porosity of the alumina-containing coating layer is preferably 20 to 90% by volume, and more preferably 30 to 70% by volume, since the multilayer separation membrane for a nonaqueous electrolyte secondary battery with an alumina-containing coating layer can obtain sufficient ionic permeability. The pore size of pores possessed by the alumina-containing coating layer is preferably 1 µm or less, and more preferably 0.5 µm or less, since the multilayer separation membrane for a nonaqueous electrolyte secondary battery with an alumina-containing coating layer can obtain sufficient ionic permeability.

The air permeability of the multilayer separation membrane is preferably 30 to 1,000 seconds/100 mL, and more preferably 50 to 800 seconds/100 mL, in terms of the Gurley value. When the multilayer separation membrane has the air permeability, it is possible to obtain sufficient ionic permeability when the multilayer separation membrane is used as a member for a nonaqueous electrolyte secondary battery.

If the air permeability exceeds the above range, it means that the multilayer separation membrane has a coarse multilayer structure because of high porosity of the multilayer separation membrane. As a result, the strength of the separation membrane may be reduced, leading to insufficient shape stability at high temperature. Meanwhile, if the air permeability is in the above range, it may be impossible to obtain sufficient ionic permeability when the multilayer separation membrane is used as a member for a nonaqueous electrolyte secondary battery, lading to degradation of battery characteristic of a nonaqueous electrolyte secondary battery.

EXAMPLES

Examples and Comparative Examples that assist understanding of the present invention will be shown, but these Examples are merely illustrative of the present invention and do not limit the scope of the appended claims. It will be obvious to those skilled in the art that various changes and modifications can be made to these embodiments within the scope and technical spirit of the present invention, and it is obvious that these variations and modifications are belongs to the scope of appended claims.

Examples 1 to 2 and Comparative Examples 1 to 2

Raw material alumina powders produced by calcining aluminum hydroxide of the Bayer's method in a gas furnace were pulverized by a continuous ball mill described in FIG. 1 and classified to obtain alumina powders of Example 1 and Example 2 shown in Table 1 below. The loose bulk density (LBD), tapped bulk density (TBD), TBD/LBD, D50, D90, D10, D90/D10, D100, the content of particles in size of 20 µm or more and the BET specific surface area are shown in Table 1 below. An alumina powder obtained by only pulverizing the same raw material alumina powder as in Examples by a ball mill is shown in Comparative Example 1 in Table 1, and a commercially available alumina powder A is shown in Comparative Example 2 in Table 1.

Each method for measurement of the loose bulk density (LBD), the tapped bulk density (TBD), TBD/LBD, D50, D90, D10, D90/D10, D100, the content of particles in size of 20 µm or more (≥20 µm (ppm)) and the BET specific surface area will be mentioned in detail below.

(Loose Bulk Density (LBD) and Tapped Bulk Density (TBD))

The bulk density was measured in accordance with JIS R 930-2-3. A glass measuring cylinder having an inner diameter of 37 mm, a height of 186 mm and an inner volume of 200 mL was used as a measuring container of TBD and LBD. A powder was naturally dropped from a height of 1 cm above the upper end of the measuring cylinder and the power was charged in the measuring cylinder until the cylinder was filled up. After leveling off the powder overflowing from the upper end of the measuring cylinder using a glass rod, the mass of the powder in the measuring cylinder was measured and a loose bulk density (LBD) was calculated by dividing the mass by a volume of the measuring cylinder. Thereafter, tapping was performed by dropping the measuring cylinder 100 times from the height of 3 cm. At that time, the volume is read, and then a tapped bulk density (TBD) was calculated by dividing the mass by said volume. It should be confirmed that a reduction in volume of the powder was saturated during tapping 100 times when the measurement was performed. The value of TBD/LBD was also shown in Table 1.

(Particle Diameter (D50, D90, D10 and D100))

Using a laser particle size distribution analyzer ["Microtrac MT3300EXII", manufactured by MicrotracBEL Corp.], measurement was made by a laser diffraction method. From the small diameter side of the particle size distribution, particle diameters equivalent to 10%, 50%, 90% and 100% in the volume-based cumulative particle size distribution were called D10, D50, D90 and D100, respectively. In the measurement, ultrasonic dispersion was performed using an aqueous 0.2% by mass sodium hexametaphosphate solution for 5 minutes, and a refractive index was set at 1.76.

(Content of Coarse Particles in Size of 20 μm or more (≥20 μm (ppm)))

In a 1,000 mL beaker, 200 g of an alpha-alumina powder and 750 mL of pure water containing 0.4% sodium hexametaphosphate as a dispersing agent were charged, and then dispersed by irradiation with ultrasonic wave (300 W) for 5 minutes to prepare an alpha-alumina slurry. The slurry was passed through a 20 μm sieve and dried together with the sieve, and then the alpha-alumina powder remaining on the sieve was collected. The amount of alpha-alumina remaining on the sieve was divided by 200 g of alpha-alumina charged to obtain the content (ppm by weight) of coarse particles in size of 20 μm or more.

(BET Specific Surface Area ($m^2$/g))

Using "HM model-1201" manufactured by MOUNTECH Co., Ltd. as a specific surface area measuring device, a BET specific surface area was determined by a nitrogen adsorption method (single-point method) in accordance with the method defined in JIS-Z8830 (2013). A drying treatment before the measurement was performed by heating under a nitrogen gas flow at 200° C. for 20 minutes.

(Fabrication of Base Material Porous Film (Separator))

To 70% by mass of an ultrahigh molecular weight polyethylene powder (340 M, manufactured by Mitsui Chemicals, Inc.) and 30% by mass of a polyethylene wax having a mass average molecular weight of 1,000 (FNP-0115, manufactured by Nippon Seiro Co., Ltd.), 0.4 part by mass of an antioxidant (Irg 1010, manufactured by Ciba Specialty Chemicals), 0.1 part by mass of an antioxidant (P 168, manufactured by Ciba Specialty Chemicals) and 1.3 parts by mass of sodium stearate were added based on 100 parts by mass of the ultrahigh molecular weight polyethylene and the polyethylene wax and, further, calcium carbonate having an average particle size of 0.1 μm (manufactured by Maruo Calcium Co., Ltd.) was added so as to be 38% by volume based on the total volume. After mixing by a Henschel mixer in a powder state, the mixture was melt-kneaded by a twin-screw kneader to obtain a polyolefin resin composition. The melt-extruded polyolefin resin composition was rolled by a pair of rolls each having a surface temperature of 150° C. to obtain a sheet. The sheet thus obtained was immersed in an aqueous hydrochloric acid solution (hydrochloric acid: 4 mol/L, nonionic surfactant: 0.5% by mass) to remove calcium carbonate, followed by stretching at 105° C. by 6 times to obtain a base material porous film (thickness: 16.2 μm, basis weight: 7.3 g/$m^2$, air permeability: 140 seconds/100 cc).

(Formation of Alumina-Containing Coating Layer)

An alumina-containing coating layer was formed on the base material porous film by the following method to form a multilayer porous film.

Carboxymethyl cellulose manufactured by Daicel FineChem Co., Ltd., part No. 1110 (3 parts by mass), isopropyl alcohol (11 parts by mass), pure water (63 parts by mass) and alumina (23 parts by mass) were mixed with stirring, followed by circulation dispersion by CLEARMIX ("CLM-0.8S", manufactured by M Technique Co., Ltd.) at 15,000 rpm for 21 minutes to prepare a slurry. Subsequently, the slurry was applied on the base material porous film using each bar coater (#16, #18, #20, #22, #24 and #28) and dried at a drying temperature of 65° C. to form an alumina-containing coating layer on a surface of the base material porous film, thus obtaining a multilayer porous film.

(Basis Weight of Alumina-Containing Coating Layer)

The multilayer porous film was cut into a square in size of 8 cm×8 cm and the mass W (g) was measured, and then a basis weight (g/$m^2$) of the multilayer porous film (=W/0.08×0.08) was calculated first. The basis weight of the base material porous film was subtracted therefrom to calculate the basis weight of the alumina-containing coating layer.

With respect to the multilayer porous film on which each alumina-containing coating layer was formed, thinning of the alumina-containing coating layer and the heat resistance of the multilayer porous film were evaluated by the following method. The evaluation results are collectively shown in Table 1 below.

(1) Evaluation of Thinning of Alumina-Containing Coating Layer

The thickness (unit: μm) of the multilayer porous film was measured by a high-accuracy digital measuring instrument "VL-50A" manufactured by Mitutoyo Corporation. The thickness D (μm) of the alumina-containing coating layer was calculated after subtracting the thickness of the base material porous film from the thickness of the multilayer porous film. With respect to the multilayer porous film fabricated by each bar coater (#16, #18, #20, #22, #24 and #28), a change rate (%) of the thickness decreased or increased as compared with the thickness of the alumina-containing coating layer formed in Comparative Example 1, which is a reference (Ref), was measured. An average (%) of the change rate of the thickness was calculated, and the degree of thinning was evaluated based on the following criteria.

i) A: Thickness decreases by 20% or more as compared with Ref.

ii) B: Thickness decreases by 10% to 19% as compared with Ref.

iii) C: Thickness decreases to the same degree (thickness decreases by less than 10%) as in Ref (Comparative Example).

iv) D: Thickness is larger than Ref.

(2) Evaluation of Heat Resistance (Heat Shape Retention Ratio) of Multilayer Porous Film A multilayer porous film fabricated by a bar coater #24 was cut into a square measuring 8 cm×8 cm. After drawing a square measuring 6 cm×6 cm therein, the film was sandwiched between papers and placed in an oven heated to 150° C. After 1 hour, the film was taken out from the oven and the dimension of the side of the drawn rectangle was measured, and a heating shape retention ratio was calculated. The calculation method is as follows.

Length of draw line in MD direction before heating: L1
Length of draw line in MD direction after heating: L2
MD heat shape retention ratio (%)=(L2/L1)×100

Note that L1 and L2 are the average of left and right sides in the MD direction of the drawn square. The MD direction as used herein means a long direction during formation of the base material porous film sheet.

Evaluation was performed on the basis of the multilayer porous film of Comparative Example 1 as a reference (Ref) in accordance with the following criteria.

i) A: MD heat shape retention ratio of multilayer porous film is 95% or more and thickness of an alumina-containing coating layer is less than 6.0 μm.

ii) B: MD heat shape retention ratio of multilayer porous film is 95% or more and thickness of an alumina-containing coating layer is 6.0 μm or more and less than 7.0 μm.

iii) C: The same degree as in Ref (Comparative Example) (MD heat shape retention ratio of a multilayer porous film is 80% or more and less than 95% and thickness of an alumina-containing coating layer is 7.0 μm or more).

iv) D: MD heat shape retention ratio of a multilayer porous film is less than 80%.

TABLE 1

|  | Example | | Comparative Example | |
| --- | --- | --- | --- | --- |
|  | 1 | 2 | 1 | 2 |
| LBD (g/cm³) | 0.39 | 0.44 | 0.98 | 0.90 |
| TBD (g/cm³) | 0.74 | 0.80 | 1.39 | 1.31 |
| TBD/LBD | 1.90 | 1.82 | 1.42 | 1.46 |
| D50 (μm) | 0.50 | 0.58 | 0.47 | 0.56 |
| D90 (μm) | 0.98 | 1.26 | 1.26 | 1.45 |
| D10 (μm) | 0.26 | 0.33 | 0.23 | 0.32 |
| D90/D10 | 3.77 | 3.82 | 5.48 | 4.53 |
| D100 (μm) | 3.20 | 3.25 | 5.46 | 4.60 |
| ≥20 μm (ppm) | 1 | 3 | 2099 | 640 |
| BET (m²/g) | 5.7 | 5.6 | 6.0 | 6.0 |
| Evaluation of thinning | A | A | C | A |
| Evaluation of heat resistance | A | B | C | D |

As is apparent from Table 1, in the case of Example 1 and Example 2 in which the value of TBD/LBD is 1.5 or more (e.g., 1.82 to 1.90), the D50 value is in a range of 0.45 to 0.65 μm and the value of D90/D10 is 4 or less, and both thinning and heat resistance are excellent. The purity of the alumina powder used in Examples was measured and found to be 99.9%.

In the case of Comparative Example 1 and Comparative Example 2, since the value of TBD/LBD is less than 1.5, the heat resistance was inferior as compared with Examples.

Figure 3:
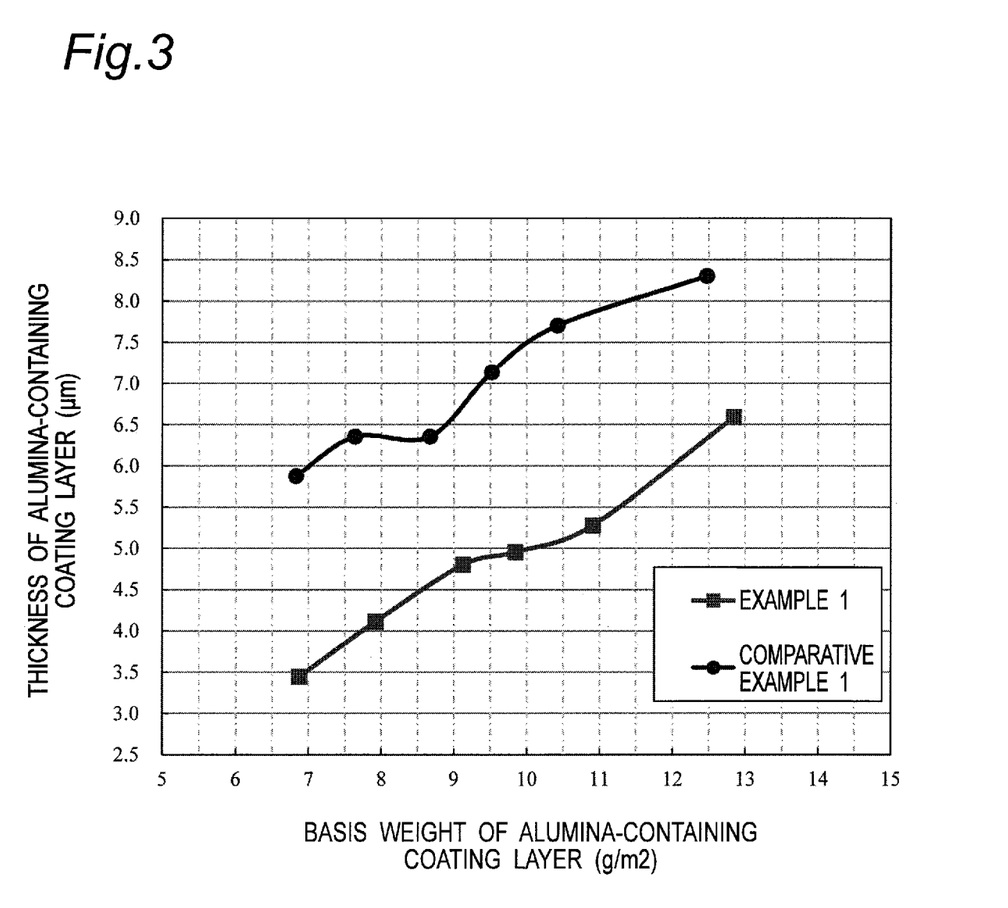
FIG. 3 shows a graph showing a change in thickness per unit content of alumina powders in Examples and Comparative Examples.

Meanwhile, FIG. 3 shows the thickness of a coating layer that varies depending on a change in amount per unit area of alumina powders of Example 1 and Comparative Example 1. FIG. 3 revealed that use of the alumina powder of Example 1 enables formation of a thinner coating layer as compared with Comparative Example 1 using in the same amount.

Figure 4:
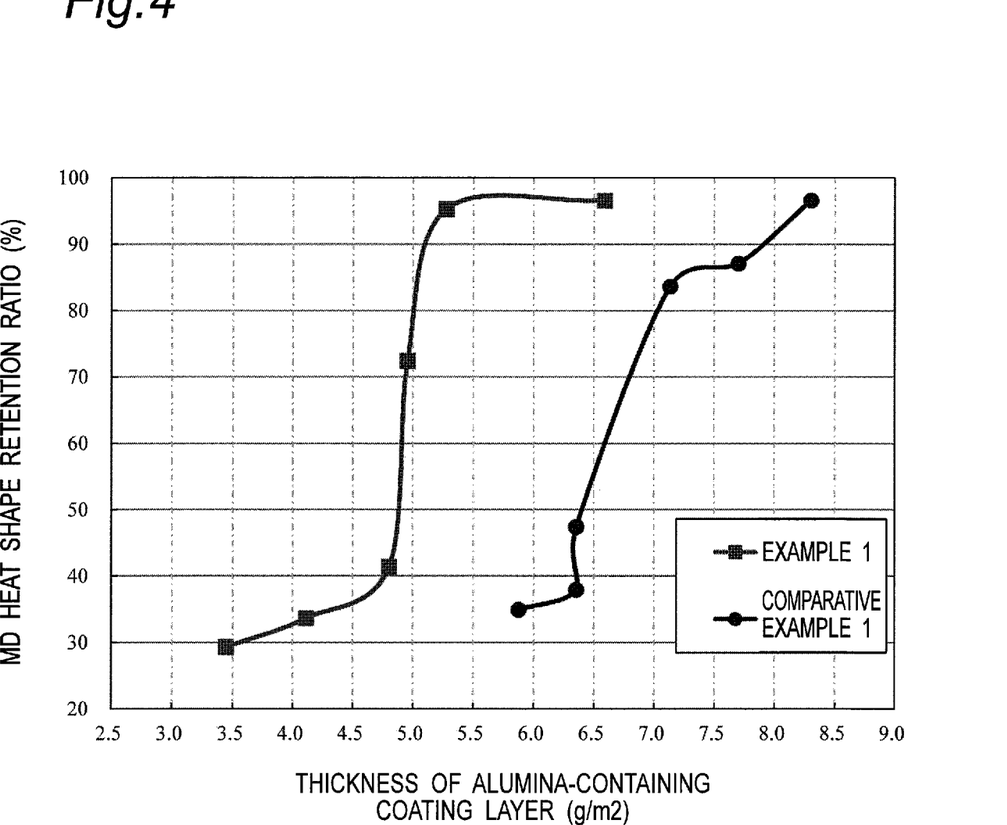
FIG. 4 is a graph showing a change in heat shape retention ratio depending on a thickness in Examples and Comparative Examples.

FIG. 4 shows the heat shape retention ratio that varies depending on the change in thickness of a coating layer formed using alumina powders of Example 2 and Comparative Example 1. FIG. 4 revealed that use of the alumina powder of Example 1 enables achievement of higher heat shape retention ratio as compared with Comparative Example 1 in a smaller thickness, leading to an improvement in heat resistance. For example, in Comparative Example 1, when the alumina basis weight is 10.4 g/m², the thickness of the alumina-containing coating layer became 7.7 μm and the heat shape retention ratio of the multilayer porous film was 87.1%. Meanwhile, in Example 1, when the alumina basis weight is 10.9 g/m², the thus formed alumina-containing coating layer could be thinned to 5.3 μm and the multilayer porous film exhibited high heat shape retention ratio, for example, 95.3%.

INDUSTRIAL APPLICABILITY

The present invention provides an alumina powder capable of forming a thin alumina-containing coating layer having a uniform thickness. The alumina powder can be used in an alumina-containing coating layer, a multilayer separation membrane and a secondary battery.

DESCRIPTION OF REFERENCE NUMERALS 200, 205: Electrode assembly
210: First electrode
220: Second electrode
230: Separation membrane
240, 245: Alumina-containing coating layer

The invention claimed is:

1. An alumina powder wherein a ratio (TBD/LBD) of a tapped bulk density (TBD) to a loose bulk density (LBD) is 1.5 or more, and wherein a BET specific surface area is 3.0 to 7.0 m²/g and a ratio (D90/D10) of a particle diameter equivalent to 90% in the volume-based cumulative particle size distribution (D90) to a particle diameter equivalent to 10% in the volume-based cumulative particle size distribution (D10) is 3.0 to 4.0.

2. The alumina powder according to claim 1, wherein the alumina powder has a purity of 99.9% by mass or less.

3. The alumina powder according to claim 1, wherein TBD/LBD is 1.82 to 1.90.

4. The alumina powder according to claim 1, wherein the LBD is 0.39 to 0.44 g/cm³ and the TBD is 0.72 to 0.80 g/cm³.

5. The alumina powder according to claim 1, wherein a particle diameter equivalent to 50% in the volume-based cumulative particle size distribution (D50) is 0.45 to 0.65 μm.

6. The alumina powder according to claim 5, wherein a particle diameter equivalent to 100% in the volume-based cumulative particle size distribution (D100) is 3.5 μm or less.

7. The alumina powder according to claim 1, wherein the content of particles having a particle diameter of 20 μm or more is less than 100 ppm.

8. An alumina slurry comprising: the alumina powder according to claim 1; a binder; and a solvent.

9. An alumina-containing coating layer comprising: the alumina powder according to claim 1; and a binder.

10. A multilayer separation membrane comprising: a separation membrane; and the alumina-containing coating layer according to claim 9 formed on at least one surface of the separation membrane.

11. A secondary battery comprising:
- a first electrode, a separation membrane and a second electrode laminated sequentially; and
- an alumina-containing coating layer formed of the alumina powder according to claim 1, the alumina-containing coating layer being formed on at least one surface of the first electrode, the separation membrane or the second electrode.

12. The secondary battery according to claim 11, wherein the alumina-containing coating layer is formed on at least one interface of an interface between the first electrode and the separation membrane or an interface between the second electrode and the separation membrane.

13. The secondary battery according to claim 11, wherein the alumina-containing coating layer entirely coats at least one surface the first electrode, the separation membrane or the second electrode.

14. The secondary battery according to claim 11,
wherein the alumina-containing coating layer is formed on the separation membrane, and
wherein the alumina-containing coating layer is formed of a binder containing the alumina powder and a water-soluble polymer.

15. The secondary battery according to claim 11,
wherein the alumina-containing coating layer is formed on the separation membrane, and
wherein the alumina-containing coating layer is formed of a binder containing the alumina powder and an aromatic polymer.

16. The secondary battery according to claim 11,
wherein the alumina-containing coating layer is formed on the separation membrane, and
wherein the alumina-containing coating layer is formed of a binder containing the alumina powder and a fluorine-containing resin or a fluorine-containing rubber.

17. The secondary battery according to claim 11,
wherein the alumina-containing coating layer is formed on the separation membrane, and
wherein the alumina-containing coating layer is formed of a binder containing the alumina powder and acrylate-based monomer or a copolymer of two or more monomers.

* * * * *